United States Patent [19]

Krehbiel et al.

[11] 4,166,588

[45] Sep. 4, 1979

[54] SELF-THREADING TAKE-UP MAGAZINE FOR A PHOTOGRAPHIC PRINTER

[75] Inventors: Vivian D. Krehbiel; Roger L. Marvin, both of Wichita, Kans.

[73] Assignee: Kreonite Inc., Wichita, Kans.

[21] Appl. No.: 941,064

[22] Filed: Sep. 11, 1978

[51] Int. Cl.² .................. B65H 17/02; G03B 17/04; G03B 17/26
[52] U.S. Cl. ........................ 242/67.1 R; 242/71.1; 242/71.7; 355/72
[58] Field of Search ............... 242/67.1 R, 71.1, 71.7; 355/64, 72

[56] References Cited

U.S. PATENT DOCUMENTS

| | | | |
|---|---|---|---|
| 1,789,351 | 1/1931 | Caps | 355/72 X |
| 1,981,406 | 11/1934 | Young | 355/72 X |
| 4,060,210 | 11/1977 | Norris | 242/71.1 |
| 4,113,192 | 9/1978 | Osanai | 242/71.1 |

Primary Examiner—Edward J. McCarthy
Attorney, Agent, or Firm—Edwin H. Crabtree

[57] ABSTRACT

A self-threading take-up magazine for receiving exposed photographic print paper therein. The take-up magazine automatically rolling up the print paper on a magazine core as prints are taken on a photographic printer.

9 Claims, 9 Drawing Figures

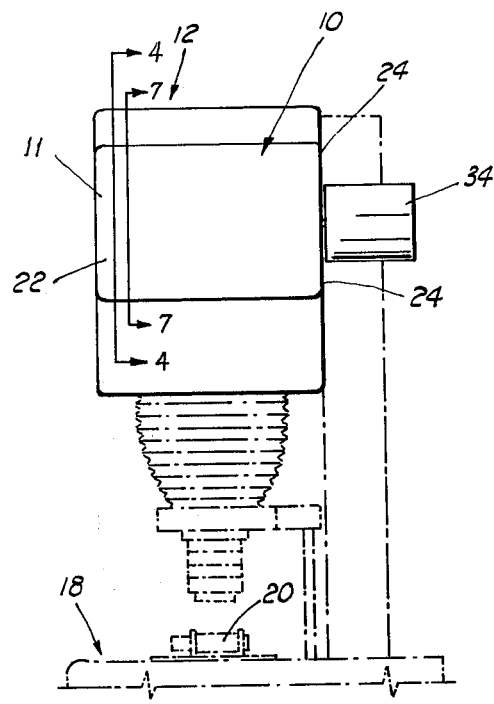
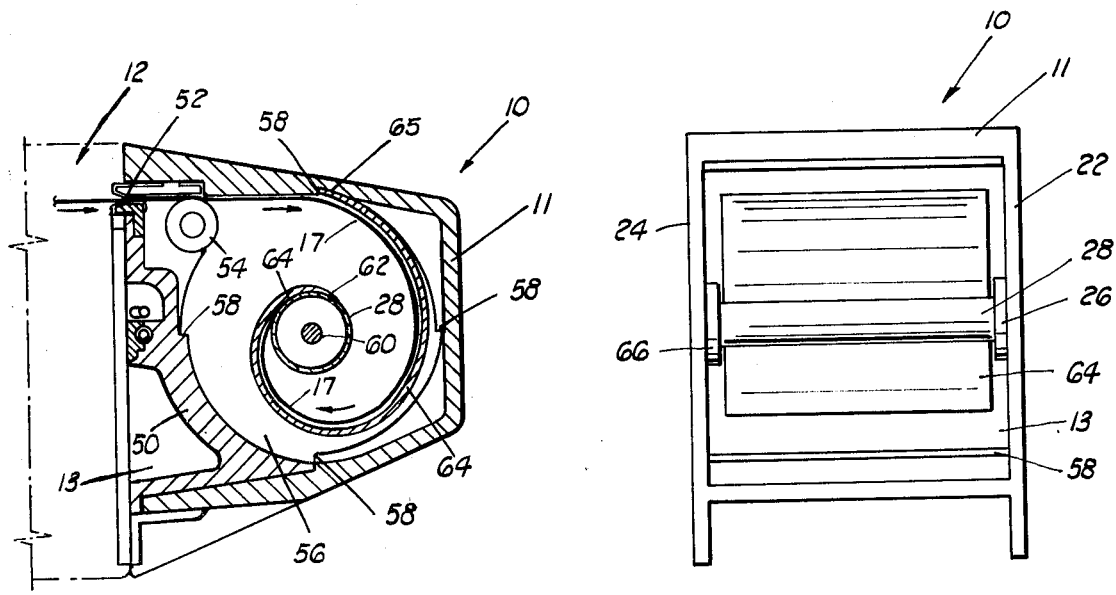
FIG. 3
FIG. 4
FIG. 5

SELF-THREADING TAKE-UP MAGAZINE FOR A PHOTOGRAPHIC PRINTER

BACKGROUND OF THE INVENTION

This invention relates generally to a take-up magazine for receiving exposed photographic print paper and more particularly but not by way of limitation, to a self-threading take-up magazine for mounting on a print head on a photographic printer.

Heretofore photographic printers having a take-up magazine have been manually operated by rolling by hand the exposed photographic paper on a magazine core. High speed printers have used motor drive take-up devices having a direct mechanical coupling to the magazine housing. None of the prior art printers have provided a self threading take-up magazine which automatically rolls the exposed print paper on the magazine which automatically rolls the exposed print paper on the magazine core. Also, these printers do not have the advantage of driving the take-up magazine with a drive means that is not directly connected to the magazine housing.

SUMMARY OF THE INVENTION

The subject invention provides a self-threading take-up magazine for a photographic printer eliminating the time required in the past to manually thread the exposed print paper on a magazine core. The self-threading feature of the invention reduces paper consumption, since paper is no longer required as a leader in manually threading the paper in the magazine housing.

The take-up magazine provides an electric drive motor having a magnetic rotor which provides an eddy current clutch for rotating the magazine core. This type clutch eliminates a mechanical coupling attached to the magazine housing. The magazine, because it is not connected to the drive motor, can be quickly removed and installed for changing the print paper. The eddy current clutch provides a coupling for rotating the magazine core with no sliding or rotating clutch parts that are subject to wear thereby reducing maintenance on the printer.

The self-threading take-up machine includes a light tight magazine having side walls. The housing is adapted for receipt on the printer head of the photographic printer. A magazine core is rotatably mounted on the side walls of the housing, a flat flexible sheet is attached to the magazine core and extends outwardly from the core forming a spiral configuration inside the housing with the opposite edge of the sheet resting against the inside of the housing. The sheet receives the leading edge of the exposed print paper and guides the paper onto the magazine core. The leading edge of the print paper is sandwiched between the sheet and the outer circumference of the magazine core when the magazine core is rotated inside the housing. An electrically conductive metal disk is mounted on one of the side walls of the housing. The disk is attached to one end of the core. An electric motor having a magnetic rotor is disposed adjacent the magazine housing with the magnetic rotor in axial alignment with the disk. When the electric motor is actuated the rotor is rotated and an eddy current is produced for rotating the disk and winding the print paper on the magazine core.

The advantages and objects of the invention will become evident from the following detailed description when read in conjunction with the accompanying drawings which illustrate the preferred embodiments of the invention.

BRIEF DESCRIPTION OF THE DRAWINGS

FIG. 3 is a side view of the take-up magazine mounted on the printer head.

FIG. 4 is a side sectional view of the magazine housing taken along lines 4—4 shown in FIG. 3.

FIG. 5 is a front view of the magazine housing removed from the printer head.

DETAILED DESCRIPTION OF THE DRAWINGS

Figure 1:
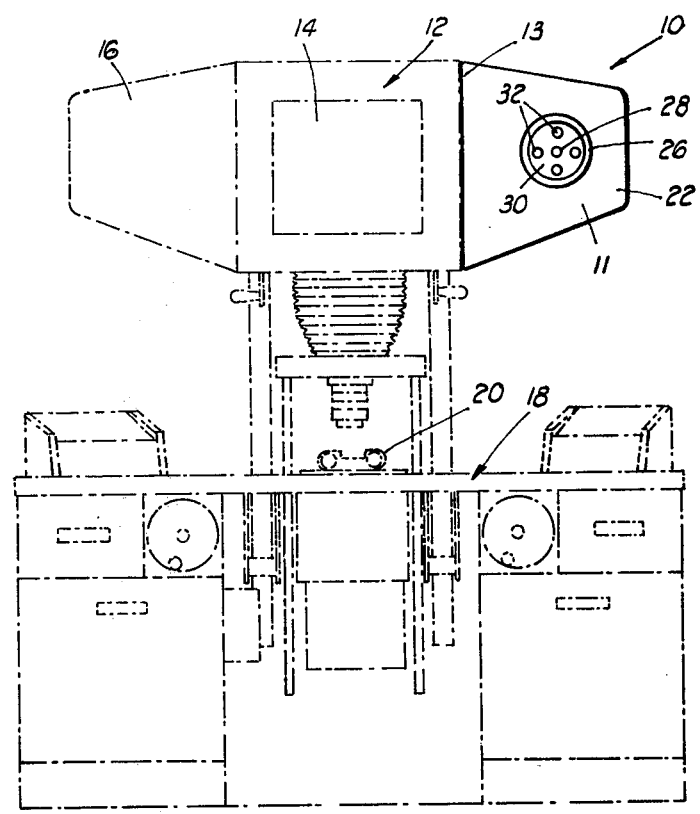
FIG. 1 is a front view of the self-threading take-up magazine attached to a printer head of a photographic printer.

In FIG. 1 the self-threading take-up magazine is designated by general reference numeral 10. The magazine 10 includes a light tight magazine housing 11. The housing 11 includes an open front portion 13 which is attached to one side of a printer head 12. The printer head 12 includes a view screen 14 and a paper supply magazine 16. The print paper supply magazine 16 feeds the print paper 17 through the printer head 12 and into the take-up magazine 10. The print paper 17 can be seen being fed into the light tight housing 11 in FIG. 4. The printer head 12 is slidably mounted above the top of a flat printer control table 18 which is used for receiving a holder 20. The holder 20 holds film negatives or positives on the table 18 to be printed by the printer head 12.

The light tight magazine housing 11 includes a pair of side walls 22 and 24. The side wall 24 can be seen in FIG. 3. The side wall 22 includes a bearing housing 26 having a bearing attached to one side of a magazine core 28. Attached to the core 28 is a metal disk 30 having apertures 32 therein. By placing a finger in one of the apertures 32 the disk 30 and the core 28 may be rotated for manual adjustment of the core 28 in the housing 11.

Figure 2:
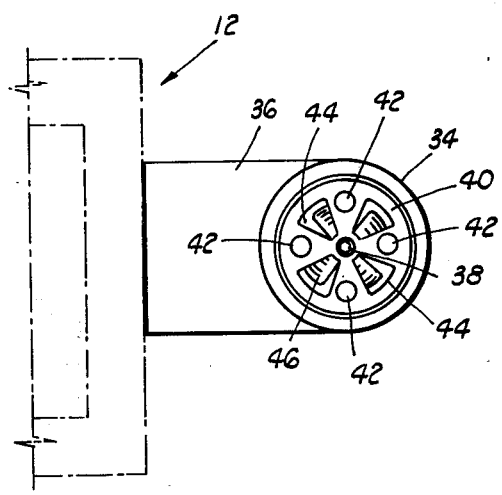
FIG. 2 is a front view of an electric motor and a magnetic rotor attached to a portion of the printer head.

In FIG. 2 a side view of an electrically driven motor 34 is shown attached to the side of the printer head 12 by a support arm 36. The electric motor 34 includes a drive shaft 38 which is attached to a magnetic rotor 40 having magnets 42 disposed around the circumference of the rotor 40. The rotor 40 further includes apertures 44 therein. Also attached to the drive shaft 38 is a fan blade 46 which is used to assist in cooling the motor by drawing air through the apertures 44 in the magnetic rotor 40.

In FIG. 3 a side view of the take-up magazine 10 can be seen attached to the printer head 12. In this view the electric motor 34 can be seen disposed adjacent to and in a spaced relationship to the side wall 24 of the housing 11. The drive shaft 38 of the electric motor 34 is in axial alignment with the axis of the magazine core 28 shown in FIG. 1.

In FIG. 4 a side cross sectional view of the magazine housing 11 is shown attached to the side of the printer head 12. The open front portion 13 of the housing 11 slidably receives a magazine insert 50 therein.

The upper portion of the magazine insert 50 provides a light tight entrance 52 with a portion of the housing 11 for receiving the exposed print paper 17 from the print head 12. The print paper 17 is guided into the housing 11 by a roller 54.

The magazine insert 50 and the inside of the housing 11 form a circular shaped cavity 56 with a plurality of steps 58 formed around the circumference of the cavity 56 at approximately 90° from each other.

In this view the magazine core 28 can be seen having a hollow interior with a core shaft 60 at both ends of the hollow core 28. Attached to the outer circumference of the core 28 is one edge 62 of a flat flexible sheet 64. The flat flexible sheet 64 may be made of plastic or any similar material and is angular in shape. The sheet 64 extends outwardly from the magazine core 28 in a spiral configuration with an edge 65 resting against the inside of the housing 11 and adjacent one of the steps 58. The height of the step 58 is equal to or greater than the thickness of the sheet 64 so that as the exposed print paper 17 enters the cavity 56 and rides against the interior sides of the housing 11, the paper 17 rides over the edge 65 which is riding against one of the steps 58 and is received on and guided inwardly along the inside of the sheet 64 until the leading edge of the paper 17 is received on the outer circumference of the magazine core 28. Without the steps 58 the leading edge of the paper 17 could slip between the inside of the housing 11 and the outside of the sheet 64 thereby preventing the paper 17 from being wound on the core 28. As mentioned under the discussion of FIG. 1 the core 28 may be rotated by turning the disk 30 by hand. By turning the core 28 by hand the edge 65 of the sheet 64 is turned until it drops beside one of the steps 58. This is done prior to operating the magazine 10 and assures that the paper 17 will be automatically wound on the core 28.

When the exposed print paper 17 has been completely wound on the magazine core 28 and it is desired to change the paper 17, the magazine 10 is detached from the printer head 12. The magazine 10 is then placed on a paper processing machine and the exposed paper 17 is taken off the magazine core 28 for developing.

Figure 4A:
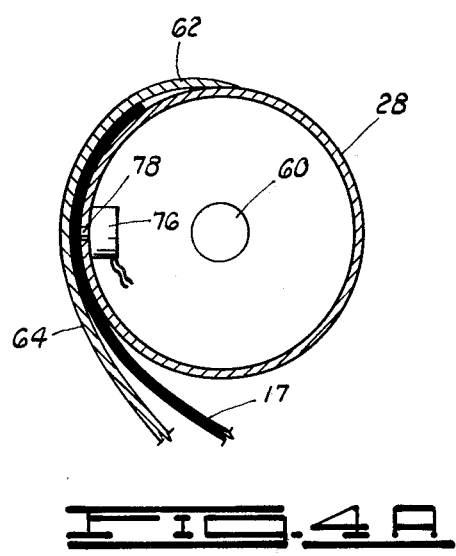
FIG. 4A is an enlarged cross section of the magazine core and a portion of the paper guide sheet.

In FIG. 4A an enlarged cross section of the magazine core 28 is shown with the edge 62 of the flat angular sheet 64 attached to a portion of the outer circumference of the hollow core 28. In this view the leading edge of the print paper 17 can be seen sandwiched between the sheet 64 and the outer circumference of the magazine core 28.

A switch 76 is shown attached to the inner diameter of the core and disposed in front of an aperture 78 through the core 28. The switch 76 may be any standard type of mechanically operated switch or a light sensitive switch for detecting when the leading edge of the paper 17 is received on the outer circumference of the magazine core 28. The switch 76 is electrically connected to the electric motor 34 for turning on the motor 34 so that the take-up magazine 10 may be activated for automatically winding the print paper 17 on the core 28. While the switch 76 is shown it should be appreciated that there may be any number of other ways to activate the motor 34 when it is desired to wind the print paper 17 in the housing 11. For example, the electrical circuitry of the print head 12 could be timed to count the advance of the paper 17 fed into the magazine housing 11.

When a predetermined amount of the paper 17 is received in the housing 11, the motor 34 would be signaled and activated.

In FIG. 5 a front view of the inside of the magazine housing 11 is shown. Also in FIG. 5 is the bearing housing 26 and a bearing housing 66 attached to the opposite end of the core 28. The bearing housing 66 is mounted in the side wall 24.

Figure 6:
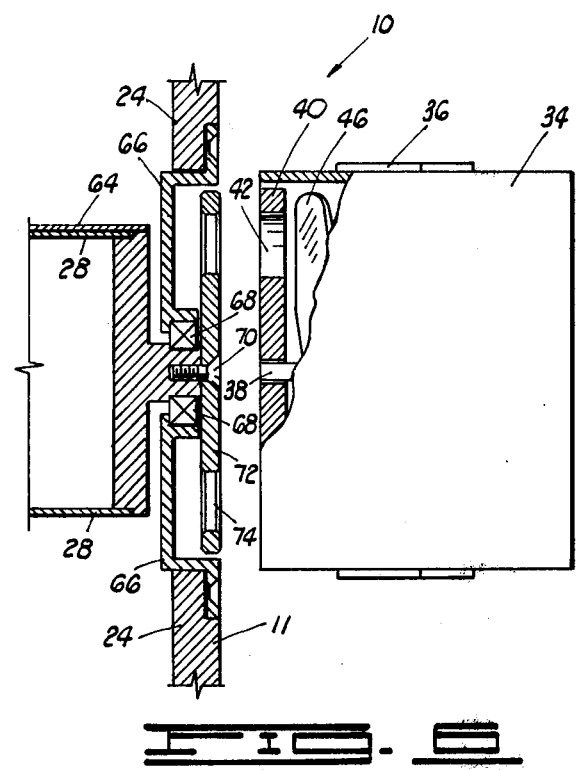
FIG. 6 is a partial sectional view of the magazine core attached to the metal disk and the magnetic rotor attached to the electric motor.

In FIG. 6 a partial cross sectional view of the magazine core 28, side wall 24 and electrical motor 34 with magnetic rotor 40 is shown. In this view the magazine core 28 can be seen having the core shaft 60 mounted on a bearing 68 which is attached to the bearing housing 66. Attached to the core shaft 60 by a threaded screw 70 is an electrically conductive metal disk 72 having apertures 74 around the circumference of the disk 72. The disk 72 is similar to the metal disk 30 shown in FIG. 1 and made of any good conductive metal such as copper, aluminum and the like. The disk 72 is in axial alignment with the magnetic rotor 40 and in a spaced relationship thereto. When the electric motor 34 is activated, the magnetic rotor 40 as it rotates on the drive shaft 38 creates an eddy current with the electrically conductive metal disk 72 thereby providing a clutch which engages and rotates the magazine core 28 for taking up the print paper 17. The use of the eddy current clutch eliminates a direct mechanical clutch connection with the magazine housing 11 and magazine core 28. Also it can be appreciated that the eddy current clutch eliminates frictional wear by not having any sliding or rotating parts connected to the housing 11.

Figure 7:
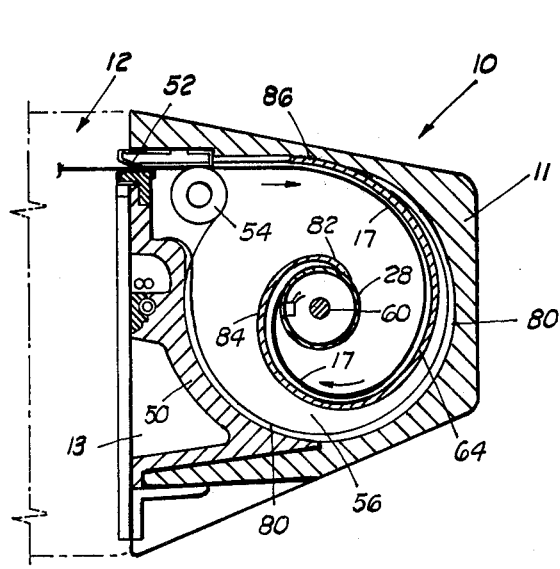
FIG. 7 is a side sectional view of the magazine housing taken along lines 7—7 shown in FIG. 3. and is similar to FIG. 4 except the magazine housing includes a groove around the inner circumference of the housing.

In FIG. 7 a side sectional view of the magazine housing 11 is shown attached to the side of the printer head 12. This view is similar to FIG. 4 except the circular shaped cavity 56 inside the housing 11 rather than having a plurality of steps 58 has a groove 80 around the circumference of the cavity 56 and the magazine insert 50.

Mounted on the magazine core 28 is a flat flexible sheet 84. The flat flexible sheet 84 is angular in shape and it is similar to the sheet 64 described in the discussion under FIG. 4. The sheet 84 which can also be seen in FIG. 8 extends outwardly into the circular shaped cavity 56, forming a spiral configuration with an opposite side 86 of the sheet 84 received in the circular groove 80. The groove 80 has a width greater than the width of the sheet 84 and a depth greater than the thickness of the sheet 84.

Figure 8:
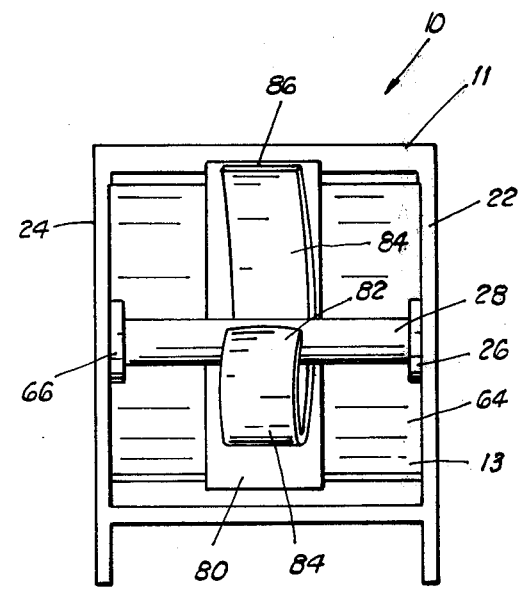
FIG. 8 is a front view of the magazine housing shown in FIG. 7.

As seen in FIG. 8 the groove 80 by having a width greater than the sheet 84 receives the sheet 84 therein as it is rotated in the housing 11. By the groove 80 having a depth greater than the thickness of the sheet 84, the leading edge of the paper 17 when entering the housing 11, rides over the edge 86 of the sheet 84 and the paper 17 is received on and guided inwardly along the inside of the sheet 84 until the paper 17 is received on the outer circumference of the magazine core 28 and wound thereon. Also it should be noted that the paper 17 would always have a width greater than the width of the groove 80 to avoid having the paper 17 fall into the groove 80 and possibly ride under the edge 86 of the sheet 84.

Changes may be made in the construction and arrangement of the parts or elements of the embodiments as disclosed herein without departing from the spirit or scope of the invention defined in the following claims.

I claim:

1. A self-threading take-up magazine for attaching to a printer head of a photographic printer, the magazine receiving exposed photographic print paper and automatically rolling up the print paper therein, the magazine comprising;

a light tight magazine housing having side walls and adapted for receipt on the printer head and receiving the print paper therein;

a magazine core rotatably mounted on the side walls inside said housing;

a flat flexible paper guide sheet, one edge of said sheet attached to said magazine core, said sheet extending outwardly from said magazine core with the opposite edge of sheet resting against the inside of said housing, said sheet receiving the leading edge of the exposed print paper and guiding the paper onto the magazine core;

an electrically conductive metal disk mounted in one of the side walls of said housing, said disk attached to one end of said magazine core; and drive means positioned beside the outside of one of the side walls of said housing for rotating a magnetic rotor, said magnetic rotor in axial alignment with said disk and disposed adjacent thereto, when said rotor is rotated an eddy current clutch is produced between said rotor and said disk for rotating said disk and winding the print paper on said core.

2. The magazine as described in claim 1 further including switch means mounted on said magazine core for turning on said drive means when the leading edge of the print paper contacts said magazine core and activates said switch means.

3. The magazine as described in claim 1 wherein said drive means is an electric motor having a drive shaft extending outwardly therefrom and attached to said magnetic rotor.

4. The magazine as described in claim 1 wherein said electrically conductive metal disk is made of a metal such as copper, aluminum, and the like.

5. The magazine as described in claim 1 wherein said magazine core includes end portions mounted on bearings, said bearings mounted in bearing housings, said bearing housings attached to the opposite side walls of said magazine housing, said disk mounted in one of said bearing housings and attached to one of the end portions of said magazine core.

6. The magazine as described in claim 5 further including a second metal disk attached to the other end portion of said magazine core, said second metal disk used for manually rotating said magazine core.

7. A self-threading take-up magazine for attaching to a printer head of a photographic printer, the magazine receiving exposed photographic print paper and automatically rolling up the print paper therein, the magazine comprising:

a light tight magazine housing having side walls and adapted for receipt on the printer head and receiving the print paper therein;

a magazine core rotatably mounted on the side walls inside said housing;

a flat flexible paper guide sheet, one edge of said sheet attached to said magazine core, said sheet extending outwardly from said magazine core and forming a spiral configuration inside said housing with the opposite edge of said sheet resting against the inside of said housing, said sheet receiving the leading edge of the exposed print paper and guiding the paper onto said magazine core, the leading edge of the print paper sandwiched between said sheet and the outer circumference of said core when said core is rotated inside said housing;

an electrically conductive metal disk mounted in one of the side walls of said housing, said disk attached to one end of said core;

an electric motor having a drive shaft extending outwardly therefrom, said electric motor positioned beside the outside of one of the side walls of said magazine housing; and a magnetic rotor mounted on the drive shaft of said electric motor, said rotor in axial alignment with said disk and disposed adjacent thereto, when said rotor is rotated by said electric motor an eddy current clutch is produced between said rotor and said disk for rotating said disk and winding the print paper on said core.

8. The magazine as described in claim 7, wherein said light tight magazine housing includes a circular shaped cavity in the inside thereof, said cavity having a plurality of steps formed around the circumference of said cavity, the height of said steps equal to or greater than the thickness of said sheet so that the opposite edge of said sheet when resting against one of said steps will allow the leading edge of the print paper to ride over the opposite edge of said sheet prior to being guided inwardly along the inside of said sheet.

9. The magazine as described in claim 7, wherein said light tight magazine housing includes a circular shaped cavity in the inside thereof, said cavity having a groove around the circumference of said cavity, said groove sufficient in width for receiving the opposite edge of said sheet therein, said groove having a depth equal or greater than the thickness of said sheet so that when the leading edge of the print paper is received in said housing the leading edge rides over the opposite edge of said sheet prior to being guided inwardly along the inside of said sheet.

* * * * *